United States Patent
Jeong (10) Patent No.: US 9,319,676 B2
(45) Date of Patent: Apr. 19, 2016

(54) MOTION ESTIMATOR AND SYSTEM ON CHIP COMPRISING THE SAME

(71) Applicant: SAMSUNG Electronics Co., Ltd., Suwon-si, Gyeonggi-do (KR)

(72) Inventor: Kyungah Jeong, Seoul (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/466,526

(22) Filed: Aug. 22, 2014

(65) Prior Publication Data

US 2014/0363094 A1    Dec. 11, 2014

Related U.S. Application Data

(63) Continuation of application No. 13/421,304, filed on Mar. 15, 2012, now Pat. No. 8,837,843.

(30) Foreign Application Priority Data

Mar. 17, 2011    (KR) .......................... 10-2011-0024024

(51) Int. Cl.
| | |
|---|---|
| G06K 9/62 | (2006.01) |
| H04N 19/423 | (2014.01) |
| H04N 19/176 | (2014.01) |
| H04N 19/115 | (2014.01) |
| H04N 19/156 | (2014.01) |
| H04N 19/164 | (2014.01) |
| H04N 19/43 | (2014.01) |
| H04N 19/57 | (2014.01) |

(52) U.S. Cl.
CPC ....... *H04N 19/00484* (2013.01); *H04N 19/115* (2014.11); *H04N 19/156* (2014.11); *H04N 19/164* (2014.11); *H04N 19/176* (2014.11); *H04N 19/423* (2014.11); *H04N 19/43* (2014.11); *H04N 19/57* (2014.11)

(58) Field of Classification Search
USPC ........................ 382/190, 232, 233, 236, 238; 375/240.03, 240.08, 240.12, 240.14, 375/240.16, 240.24, 240.29; 345/530, 536, 345/557; 348/14.08, 14.13, 699
See application file for complete search history.

(56) References Cited

U.S. PATENT DOCUMENTS

| | | | |
|---|---|---|---|
| 6,895,048 B2 * | 5/2005 | Boice et al. | 375/240.02 |
| 7,006,100 B2 * | 2/2006 | Phong et al. | 345/557 |
| 8,837,843 B2 * | 9/2014 | Jeong | 382/236 |
| 2005/0024487 A1 * | 2/2005 | Chen | 348/14.13 |
| 2005/0190976 A1 | 9/2005 | Todoroki et al. | |
| 2006/0165163 A1 * | 7/2006 | Burazerovic et al. | 375/240.03 |
| 2007/0201554 A1 * | 8/2007 | Sihn | 375/240.12 |
| 2007/0280349 A1 * | 12/2007 | Prieto et al. | 375/240.03 |
| 2012/0207227 A1 * | 8/2012 | Tsai et al. | 375/240.29 |

FOREIGN PATENT DOCUMENTS

| | | |
|---|---|---|
| JP | 2005-244844 | 9/2005 |
| JP | 2010-016696 | 1/2010 |
| KR | 10-0621137 | 9/2006 |
| KR | 10-0891116 | 3/2009 |

* cited by examiner

*Primary Examiner* — Amir Alavi
(74) *Attorney, Agent, or Firm* — Muir Patent Law, PLLC (57) ABSTRACT

A motion estimation device includes a memory to store a reference image, a bus connected to the memory; and a motion estimator to control a size of data of a reference image block depending on an available bandwidth of the bus when extracting at least one reference image block for motion estimation from the reference image through the bus.

19 Claims, 5 Drawing Sheets

MOTION ESTIMATOR AND SYSTEM ON CHIP COMPRISING THE SAME

CROSS-REFERENCE TO RELATED APPLICATIONS

This U.S. non-provisional patent application is a Continuation of prior application Ser. No. 13/421,304, filed on Mar. 15, 2012 now Pat. Ser. No. 8,837,843 in the United States Patent and Trademark Office, which claims priority under 35 U.S.C. §119 of Korean Patent Application No. 10-2011-0024024, filed on Mar. 17, 2011, the entire contents of which are hereby incorporated by reference.

BACKGROUND OF THE INVENTION

1. Field of the Invention

The present inventive concept herein relates to an image processing apparatus, and more particularly, to a motion estimation apparatus for motion estimation and a method thereof.

2. Description of the Related Art

An image processing apparatus (or an image encoding apparatus) performs motion estimation to improve compression efficiency. An image processing apparatus may include a motion estimator. The motion estimation is a motion finding to determine a position similar to a present image to be compressed from a previous image. The motion estimator may load an image to be used in the motion estimation from an external memory through a bus.

However, the bus may be shared by not only the motion estimator but also various modules in the image processing apparatus. As a demand for a high resolution image increases, a size of image for motion estimation increases and as complexity of the image processing apparatus increases, the use of bus by other modules increases.

However, a motion estimator for motion estimation loads image data having a predetermined size from a memory. If a size of image data loaded into a motion estimator from a memory increases, performance of image estimation may be improved. To achieve this, if the motion estimator increases a size of data loaded from a memory, an occupied bandwidth of motion estimator increases. At this time, the increased occupied bandwidth of the motion estimator may affect operations of other modules connected to the bus. Thus, the motion estimator uses a bandwidth having a predetermined size considering operations of other modules. However, a bandwidth that can be used in the bus may vary depending on operations of modules sharing the bus.

However, since the motion estimation device loads only image data having a predetermined size, there may be a problem that a bandwidth not used in the bus is not sufficiently used to improve performance of motion estimation.

SUMMARY OF THE INVENTION

The present general inventive concept provides an apparatus and method of processing data for motion estimation.

Additional aspects and advantages of the present general inventive concept will be set forth in part in the description which follows and, in part, will be obvious from the description, or may be learned by practice of the general inventive concept.

Embodiments of the inventive concept provide a motion estimation device. The motion estimation device may include a memory storing a reference image, a bus connected to the memory, and a motion estimator to control a size of data of a reference image block depending on an available bandwidth of the bus when extracting one or more reference image blocks for motion estimation from the reference image through the bus.

Embodiments of the inventive concept also provide a method of estimating a motion of a motion estimation device. The method may include obtaining an available bandwidth from an occupied bandwidth of a bus, controlling a data size of one or more reference image blocks for motion estimation from a reference image in a memory connected through the bus on the basis of the available bandwidth, extracting a candidate image block corresponding to a present image block among the one or more reference image blocks by controlling a data size of the one or more reference image blocks, and performing motion estimation by extracting a motion vector from the extracted candidate image block.

The foregoing and/or other features and utilities of the present general inventive concept may also be achieved by providing a motion estimation device including a memory to store an image, a bus connected to the memory, and a motion estimator to adjust a data size or amount of one or more image blocks of the image according to a bandwidth of the bus, and to communicate with the memory through the bus to read data of each of the one or more image blocks of the image from the memory for motion estimation according to the adjusted data size.

The motion estimator may adjust the data size or amount of the one or more image blocks of the image during the motion estimation of the image.

The memory may store a plurality of images including the image, and the motion estimator may adjust the data size or amount of the one or more image blocks of each of the images during the motion estimation of the images.

The motion estimator may adjust the data size or amount according to a priority given to at least one of the one or more image blocks of the image.

The foregoing and/or other features and utilities of the present general inventive concept may also be achieved by providing a non-transitory computer readable recording medium to contain computer-readable codes as a program to execute a method of motion estimation, the method including obtaining an available bandwidth from an occupied bandwidth of a bus, controlling a data size of at least one or more reference image blocks for motion estimation from a reference image stored in a memory connected through the bus on the basis of the available bandwidth, extracting a candidate image block corresponding to a present image block among the one or more reference image blocks by controlling a data size of the one or more reference image blocks, and performing motion estimation by extracting a motion vector from the extracted candidate image block.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
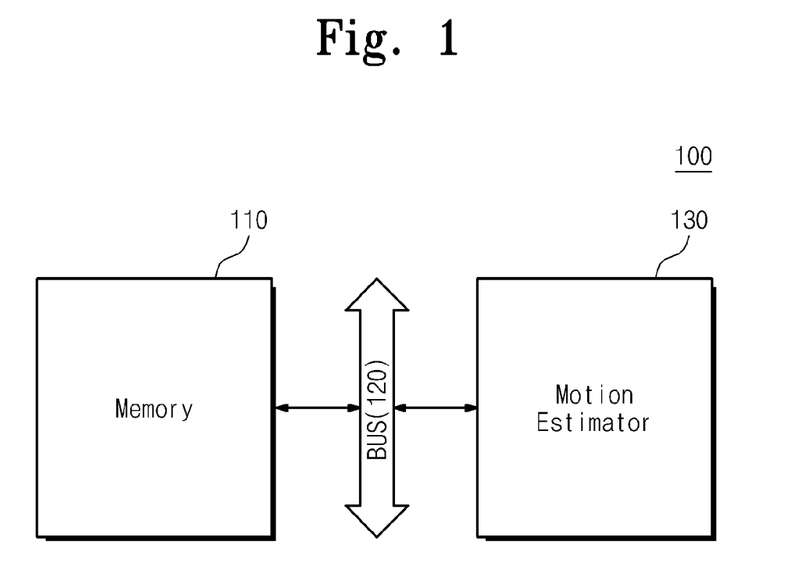
FIG. 1 is a block diagram illustrating a motion estimation apparatus in accordance with an embodiment of the inventive concept.

FIG. 1 is a block diagram illustrating a motion estimation apparatus 100 in accordance with an embodiment of the inventive concept.

Referring to FIG. 1, the motion estimation apparatus 100 includes a memory 110, a bus 120 and a motion estimator 130. The motion estimation apparatus 100 may additionally include other modules (not illustrated) connected to the bus 120 to process data and perform functions thereof.

The memory 110 stores images, for example, data corresponding to frame images or field images. The memory 110 may store a reference image used to extract a reference image block for motion estimation. An image is an image frame constituting one screen. As an illustration, the reference image may be a previous image (n−1 frame) of a present image (n frame, n is natural number), for example.

The bus 120 is an electric path commonly used to transmit data. A size of data transmitted through the bus 120 may be represented by a bandwidth (BW). The bus 120 is connected to the memory 110 and the motion estimator 130. Thus, the bus 120 transmits data between the memory 110 and the motion estimator 130. Also, the bus 120 may be connected to other modules to transmit data.

The motion estimator 130 performs motion estimation to estimate a motion in an image to compress the image. To achieve this, the motion estimator 130 extracts a reference image block from the memory 110. Herein, the reference image block may be one or more.

The motion estimator 130 compares a present image block constituting the present image with the reference image block. The motion estimator 130 may select a candidate image block which is most similar to the present image block from the reference image block. This can make the motion estimator 130 to obtain a motion vector that can estimate a position of the present image block from the reference image. The motion vector obtained from the motion estimator 130 is used to encode the present image block. Thus, the motion estimator 130 may be included in an image encoder. Accordingly, motion estimation and image encoding using the motion vector can be performed in the motion estimator 130.

On the basis of an available bandwidth of the bus 120, the motion estimator 130 controls at least one of a size and/or a quantity of data of the reference image block to be extracted from the reference image of the memory 110. This can make the motion estimator 130 to control at least one of a size and a quantity of data of a candidate image block extracted from the memory 110 so that performance of motion estimation is maximally guaranteed within an available bandwidth of the bus 120.

As described above, the motion estimator 130 continues to read and receive data from the memory 110 through the bus 120 until the motion estimation and/or the image encoding are completed.

The unit of data to be read and transmitted from the memory 110 to the motion estimator 130 may be variable during the motion estimation and/or the image encoding. It is possible that the data unit read and transmitted for the motion estimation may be a first data unit according to a first bandwidth of the bus 120 and a second data unit according to a second bandwidth of the bus 120. The first data unit can be a first size and/or quantity of data of the reference image block, and the second data unit can be a second size and/or quantity of data of the reference image block.

When the motion estimator 130 determines a data unit, it is possible that the motion estimator 130 may output a signal corresponding to the data unit to the memory 110 to read the determined image data of the reference image block. It is possible that the motion estimator 130 may output a command corresponding to the data unit so that the memory 110 can read and output the data of the reference image block from its memory space (i.e., semiconductor memory unit) according to the command.

The motion estimation apparatus 100 may be used in an electronic apparatus to compress image data. The electronic apparatus may be a camcorder apparatus, an image processing system, an image recording system, etc.

Figure 2:
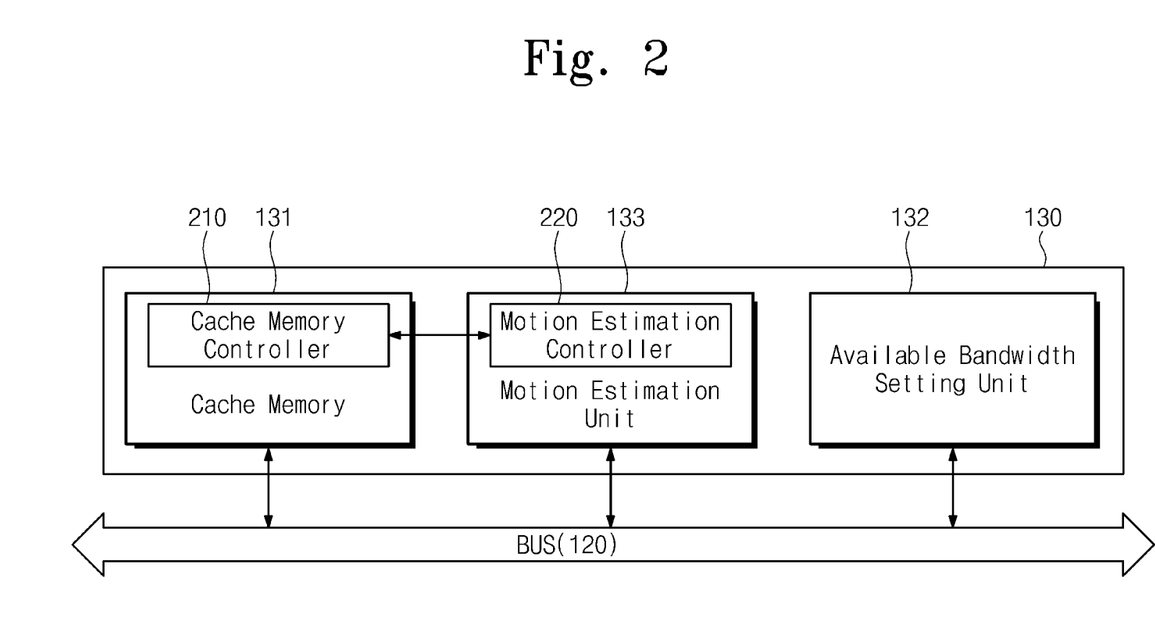
FIG. 2 is a block diagram illustrating a motion estimator in accordance with an embodiment of the inventive concept.

FIG. 2 is a view illustrating a motion estimator 130 in accordance with an embodiment of the inventive concept.

Referring to FIGS. 1 and 2, the motion estimator 130 includes a cache memory unit 131, a reference bandwidth setting unit 132 and a motion estimation unit 133. The cache memory unit 131 may include a memory, such as a cache memory, and a cache memory controller 210 to control an operation of the cache memory and the cache memory unit 131. The motion estimation unit 133 may include a motion estimation controller 220 to control an operation of the motion estimation unit 133.

The cache memory unit 131 extracts at least one reference image block from the reference image stored in the memory 110 through the bus 120 and stores the extracted reference image block in the cache memory. As an illustration, when extracting the reference image block, the cache memory unit 131 may extract a candidate image block on the basis of preset search points in the reference image. If a quantity of the search point is two or more, the cache memory unit 131 can extract the reference image block from each of the search points. The cache memory unit 131 stores at least one extracted candidate image block in the cache memory.

The cache memory unit 131 may provide a candidate image block corresponding to the present image block to the motion estimation unit 133 in response to a request of the motion estimation unit 133. If a candidate image block corresponding to the present image block exists (it is called "hit") in the reference image block, the cache memory 131 provides the corresponding candidate image block to the motion estimation unit 133. However, if a candidate image block corresponding to the present image block does not exist (it is called "miss") in the reference image block, the cache memory 131 additionally extracts reference image blocks from the memory 110 so that the candidate image block requested from the motion estimation unit 133 exists in the cache memory 131. The cache memory 131 may provide a candidate image block corresponding to the present image block requested from the motion estimation unit 133 among the additionally extracted reference image blocks to the motion estimation unit 133.

Thus, by storing the reference image blocks in the cache memory unit 131, when extracting a candidate image block, the cache memory unit 131 may reduce a time needed to read data from the external memory 110 and an occupied bandwidth of the bus 120.

The cache memory unit 131 may measure an occupied bandwidth of the bus 120 connected to the cache memory unit 131 to transmit data, through a hit rate. Herein, the hit rate is a ratio of a quantity of the hit of the candidate image blocks requested from the motion estimation unit 133 to a quantity of the candidate image blocks requested from the motion estimation unit 133. The cache memory unit 131 provides an occupied bandwidth of the cache memory unit 131 to the motion estimation unit 133. Also, when extracting a reference image block from the reference image of the memory 110, the cache memory unit 131 may control at least one of a size and a quantity of data of the reference image block extracted by a control of the motion estimation unit 133.

It is possible that the bandwidth may also be measured according to usage of the bus 120 by the cache memory unit 131 and/or other modules connected to the bus 120 to transmit data. It is possible that the bandwidth can be measured by any combination of the hit rate and the usage of the bus 120.

The size or the amount of the data of the reference image block may represent the number of pixels constituting the reference image block or data amount of each of pixels constituting the reference image block.

The reference bandwidth setting unit 132 may directly measure an occupied bandwidth of the bus 120 or may be provided with information of an occupied bandwidth of the bus 120 from other modules (not illustrated). Using the information of the occupied bandwidth, the reference bandwidth setting unit 132 sets a reference bandwidth on the basis of a bandwidth (i.e., available bandwidth) which is unoccupied bandwidth among the whole bandwidth of the bus 120. The available bandwidth includes the maximum bandwidth (MAX_BW) and the minimum bandwidth (MIN_BW) which the bus 120 can provide. Thus, the reference bandwidth setting unit 132 may set one reference bandwidth between the maximum bandwidth (MAX_BW) and the minimum bandwidth (MIN_BW).

The reference bandwidth setting unit 132 provides the set reference bandwidth to the motion estimation unit 133. The reference bandwidth setting unit 132 may be embodied by a reduced instruction set computer (RISC).

The reference bandwidth setting unit 132 checks a hit rate accumulated by one unit image (e.g., slice unit or frame unit of an image) when an encoding operation is performed. The cache memory unit 131 may receive a hit rate through the motion estimation unit 133. The reference bandwidth setting unit 132 may check a characteristic of an image being encoded through the checked hit rate. Also, the reference bandwidth setting unit 132 may determine a method of encoding an image through motion estimation, for example, weight at each mode, a search method of motion estimation, etc.

The motion estimation unit 133 extracts a candidate image block similar to the present image block from reference image blocks stored in the cache memory unit 131 to perform motion estimation.

The motion estimation unit 133 may receive a hit rate from the cache memory unit 131. As an illustration, if a hit rate increases, the motion estimation unit 133 controls the cache memory unit 131 to reduce a quantity of a reference image block (or search point) extracted from the reference image. Also, if a hit rate is reduced, the motion estimation unit 133 controls the cache memory 131 to increase a quantity of a reference image block (or search point) extracted from the reference image. This can make the motion estimation unit 133 to stably maintain an encoding time by preventing a rapid change of hit rate.

The motion estimation unit 133 may use a reference bandwidth when extracting a candidate image block. That is, the motion estimation unit 133 controls the cache memory unit 131 to extract data (candidate image block) having a size corresponding to the reference bandwidth.

For example, to optimally use a bandwidth of the bus 120, the motion estimation unit 133 may control a quantity of the candidate image block being extracted to the cache memory 131 from the memory 110. When a bus bandwidth exceeding the reference bandwidth is checked in the cache memory unit 131, the motion estimation unit 133 controls or determines a quantity of the candidate image block (or search point) extracted to the cache memory 131 to be reduced. When a bus bandwidth less than the reference bandwidth is checked in the cache memory unit 131, the motion estimation unit 133 controls or determines a quantity of the candidate image block (or search point) extracted to the cache memory unit 131 to be increased.

On the basis of an available bandwidth of the bus 120, the motion estimation unit 133 controls a size of image data (e.g., at least one of a size and a quantity of a reference image block) requested to the memory 110 by the cache memory unit 131 and thereby a bandwidth of the bus 120 for motion estimation may be maximally used.

The cache memory controller 210 measures a hit rate. Also, the cache memory controller 210 measures an occupied bandwidth of the cache memory unit 131 in the bus 120 on the basis of the measured hit rate. The cache memory controller 210 provides an occupied bandwidth of the cache memory unit 131 to the motion estimation controller 220.

The motion estimation controller 220 may provide a control signal to control an extraction of a candidate image block to the cache memory controller 210 on the basis of the reference bandwidth. If a bandwidth exceeding the reference bandwidth is occupied in the cache memory unit 131, the motion estimation controller 220 generates a control signal to reduce at least one of a size and a quantity of the reference image block (or search point) extracted to the cache memory unit 131. If a bandwidth less than the reference bandwidth is occupied in the cache memory unit 131, the motion estimation controller 220 generates a control signal to increase a quantity of the reference image block (or search point) extracted to the cache memory unit 131.

Control information generated from the motion estimation controller 220 may be provided to the cache memory controller 210.

For example, when a size of the reference image block extracted from the cache memory unit 131 has a predetermined fixed size and a plurality of reference image blocks is extracted from a plurality of search points, the motion estimation controller 220 controls a quantity of the reference image block (search point) on the basis of an occupied bandwidth provided from the cache memory controller 210. When an occupied bandwidth is greater than the reference bandwidth, the motion estimation controller 220 may remove reference image blocks among the reference image blocks to be extracted according to the priority thereof. At this time, the motion estimation controller 220 provides a control signal to remove reference image blocks having the priority lower than other image blocks.

Also, when an occupied bandwidth is equal to or less than the reference bandwidth, the motion estimation controller 220 may include reference image blocks in reference image blocks to be extracted according to the priority. At this time, the motion estimation controller 220 provides a control signal to remove reference image blocks having the priority lower than other image blocks.

Regarding reference image blocks having an overlapped motion vector, the motion estimation controller 220 controls the cache memory unit 131 so that a reference image block having the highest priority among excluded reference image blocks is first included in reference image blocks to be extracted. At this time, a reference image block to be added may be selected to have the highest motion estimation performance within the allowable maximum bandwidth on the basis of the reference bandwidth.

Herein, the priority of reference image blocks may be determined by, for example, the reference bandwidth setting unit 132.

Also, the cache memory controller 210 and the motion estimation controller 220 may additionally transmit/receive other information for motion estimation between them to perform the motion estimation operation and/or encoding operation.

Figure 3A:
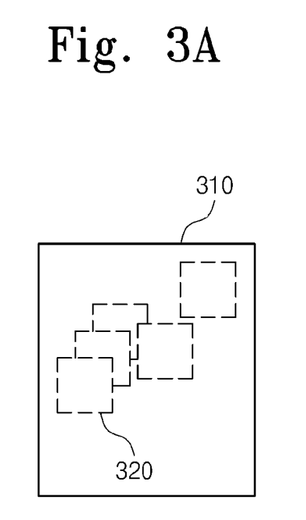
FIGS. 3A, 3B and 3C are views illustrating an operation of selecting a candidate image block through motion estimation in accordance with an embodiment of the inventive concept.
Figure 3B:
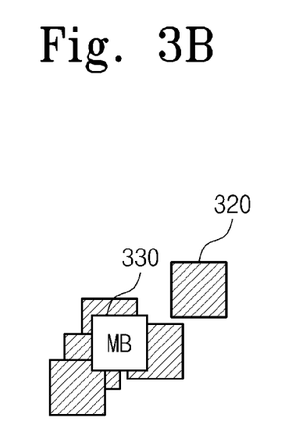
Figure 3C:
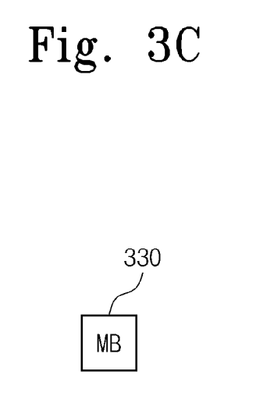

FIGS. 3A, 3B and 3C are views illustrating an operation of selecting a candidate image block through motion estimation in accordance with an embodiment of the inventive concept.

FIG. 3A illustrates an operation that the cache memory 131 extracts reference image blocks 320 from a reference image 310. The cache memory unit 131 extracts a plurality of candidate image blocks on the basis of a plurality of search points. The cache memory unit 131 may extract one reference image block on the basis of one search point. At this time, the reference image blocks 320 being extracted may have various sizes. The size of the reference image block may be a variable size during the motion estimation operation.

Referring to FIG. 3B, the motion estimation unit 133 requests the cache memory unit 131 to extract a candidate image block 330 corresponding to the present image block for compression. The cache memory unit 131 extracts candidate image blocks 330 among the reference image blocks 320 to correspond to the present image block. If the candidate image block 330 corresponding to the present image block does not exist, the cache memory unit 131 may additionally extract reference image blocks from the reference image 310. The cache memory unit 131 outputs the candidate image blocks 330 extracted from the reference image blocks 320 to the motion estimation unit 133.

Referring to FIG. 3C, when the motion estimation unit 133 receives the candidate image block 330 corresponding to the present image block from the cache memory unit 131, the motion estimation unit 133 may select the received candidate image block 330 as the present image block.

In FIGS. 3A, 3B and 3C, the present image block, the reference image blocks 320 and the candidate image block may be same.

Figure 4:
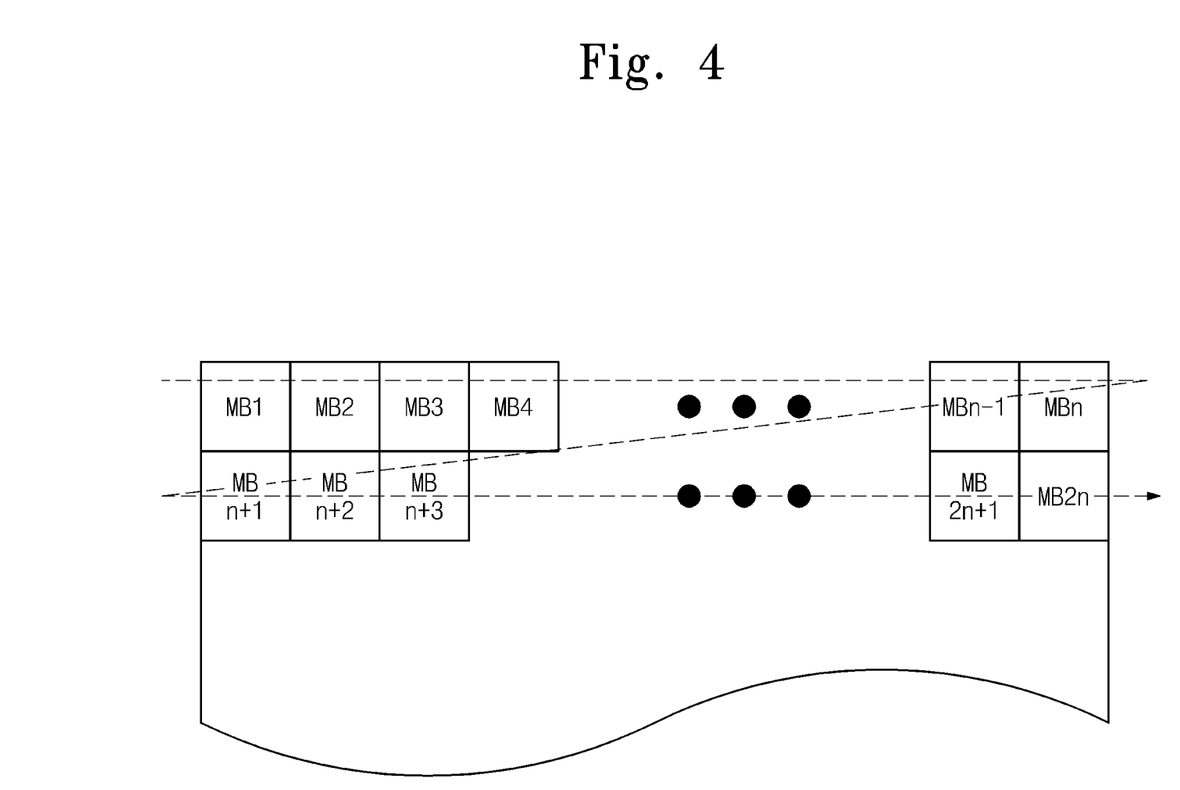
FIG. 4 is a view illustrating a time to extract a reference image block in a motion estimator in accordance with an embodiment of the inventive concept.

FIG. 4 is a view illustrating a time to extract a reference image block in a motion estimator in accordance with an embodiment of the inventive concept.

Referring to FIG. 4, the motion estimation unit 133 may set a time at which the cache memory unit 131 extracts a reference image block to a predetermined time.

The motion estimation unit 133 may set a time at which the cache memory unit 131 extracts a reference image block to a time at which the amount of changes in image between the present image blocks to perform motion estimation of the present image is great.

For example, the motion estimation unit 133 may control an operation of extracting a candidate image block on the basis of a line of the present image blocks.

A first line may include first through nth present image blocks (MB1~MBn). A second line may include n+1th through 2nth present image blocks (MBn+1~MB2n).

As described by a dotted arrow, the motion estimation unit 133 performs motion estimation on each of the present image blocks in a raster scan order as illustrated in FIG. 4.

The amount of changes in image is not great between the present image blocks connected to each other in a line direction. However, the amount of changes in image may be great between the present image blocks disposed on different lines. As an illustration, if a block for motion estimation is changed from the nth present image block (MBn) to the n+1th present image block (MBn+1), a hit rate may be reduced. As a block for motion estimation is changed from the n+1th present image block (MBn+1) in a direction of the 2nth present image block (MB2n), a hit rate may increase.

Thus, the motion estimation unit 133 may perform a reference image block extraction control operation of the cache memory unit 131 on the basis of a line change time (i.e., MB line change time) of each of the present image blocks.

Figure 5:
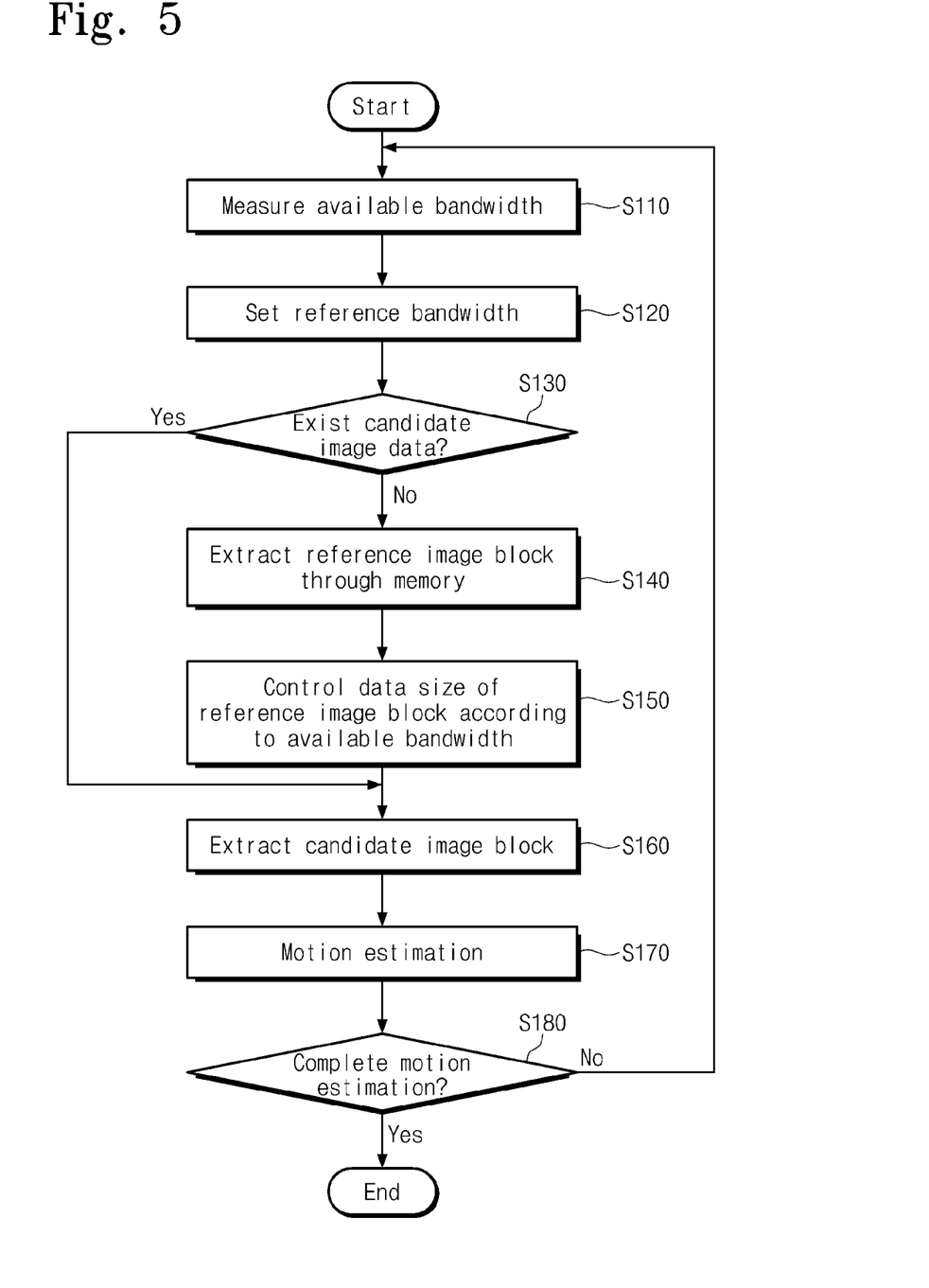
FIG. 5 is a flow chart illustrating a method of a motion estimator in accordance with an embodiment of the inventive concept.

FIG. 5 is a flow chart illustrating a method of a motion estimator in accordance with an embodiment of the inventive concept.

Referring to FIGS. 1-5, the reference bandwidth setting unit 132 measures an available bandwidth of the bus 120 at operation S110.

The reference bandwidth setting unit 132 sets a reference bandwidth for extracting a reference image block on the basis of the available bandwidth at operation S120.

The cache memory unit 131 determines whether a candidate image block corresponding to the present image block requested from the motion estimation unit 133 exists in at least one reference image block at operation S130.

If a candidate image block corresponding to the present image block exists at least one reference image block, the cache memory 131 progresses to operation S160. If a candidate image block corresponding to the present image block does not exist at least one reference image block, the cache memory 131 progresses to operation S140.

The cache memory 131 extracts a reference image block from the reference image at operation S140.

The motion estimation unit 133 controls a data size (for example, at least one of a quantity and a size of the reference image block (search point)) of the reference image block through the cache memory 131 on the basis of the available bandwidth at operation S150. As an illustration, a time at which the motion estimation unit 133 controls a size of data of the reference image block through the cache memory 131 may be set to a time at which the amount of changes between the present image blocks performing motion estimation is great, for example, a time at which the present image blocks change a line. Also, the motion estimation unit 133 may additionally control a size of data of a reference image block being extracted through the cache memory 131 according to a change of hit rate. The cache memory 131 may extract a reference image block according to a control of the motion estimation unit 133 until a candidate image block corresponding to the present image block among the reference image blocks exists in the cache memory 131.

The cache memory 131 extracts a candidate image block for motion estimation in the motion estimation unit 133 at operation S160. The cache memory 131 provides the selected candidate image block to the motion estimation unit 133.

The motion estimation unit 133 performs motion estimation using the selected candidate image block at operation S170. When performing motion estimation, the motion estimation unit 133 may control a motion estimation operation through an accumulation of the amount of use of the bus 120. The motion estimation unit 133 may obtain a motion vector from a reference image through the candidate image block.

The motion estimation unit 133 judges whether a motion estimation operation is completed or not at operation S180. If a motion estimation operation is not completed, the motion estimation unit 133 progresses to operation S130. If a motion estimation operation is completed, an operation of the motion estimator is over.

The motion estimation device of the inventive concept may maximally use a bandwidth not used in a bus when performing motion estimation. Thus, the motion estimation device may be applied to, for example, an encoder for image compression.

According to the inventive concept, a motion estimation device can maximally use a bandwidth of a bus by controlling a size of image data obtained from a memory considering an available bandwidth of bus.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. Therefore, the above-disclosed subject matter is to be considered illustrative, and not restrictive.

What is claimed is:

1. A system on chip (SoC) comprising:
a memory configured to store image data; and
a motion estimator configured to extract one or more image blocks of the image data in the memory and to adjust at least one of a size and a quantity of the image data extracted based on an available bandwidth of the motion estimator, the motion estimator including a cache memory configured to store the extracted one or more image blocks of the image data.

2. The SoC of claim 1, wherein a reference bandwidth is determined based on the available bandwidth of a bus that is connected to the motion estimator.

3. The SoC of claim 1, wherein the motion estimator is configured to determine a number of reference image blocks of a reference image that are to be extracted depending on a reference bandwidth, and to perform a motion estimation using the extracted one or more reference image blocks of the reference image.

4. The SoC of claim 3, wherein, in response to an occupied bandwidth of the cache memory exceeding the reference bandwidth, the motion estimator controls at least one of a size and a quantity of the one or more reference image blocks being extracted from the cache memory to be reduced.

5. The SoC of claim 3, wherein, in response to an occupation bandwidth of the cache memory being less than the reference bandwidth, the motion estimator controls at least one of a size and a quantity of the reference image block being extracted by the cache memory to increase.

6. The SoC of claim 5, wherein the motion estimator controls the cache memory so that the quantity of the one or more reference image blocks is increased by adding a reference image block having a relatively high priority among the one or more reference image blocks.

7. A motion estimator comprising:
a cache memory configured to extract one or more reference image blocks of a reference image;
a reference bandwidth setting unit configured to determine a reference bandwidth based on an available bandwidth; and
a motion estimation unit configured to determine a number of reference image blocks of the reference image that are to be extracted depending on the reference bandwidth, and to perform a motion estimation using the extracted one or more reference image blocks of the reference image.

8. The motion estimator of claim 7, wherein the reference bandwidth is determined based on the available bandwidth of the motion estimator.

9. The motion estimator of claim 7, wherein the reference bandwidth is determined based on the available bandwidth of a bus that is connected to the motion estimator.

10. The motion estimator of claim 7, wherein, in response to an occupied bandwidth of the cache memory exceeding the reference bandwidth, the motion estimation unit controls at least one of a size and a quantity of the one or more reference image blocks being extracted from the cache memory to be reduced.

11. The motion estimator of claim 7, wherein the motion estimation unit controls the cache memory so that a quantity of the one or more reference image blocks is reduced by removing a reference image block having relatively a low priority among the one or more reference image blocks.

12. The motion estimator of claim 7, wherein, in response to an occupation bandwidth of the cache memory being less than the reference bandwidth, the motion estimation unit controls at least one of a size and a quantity of the reference image block being extracted by the cache memory to increase.

13. The motion estimator of claim 12, wherein the motion estimation unit controls the cache memory so that the quantity of the one or more reference image blocks is increased by adding a reference image block having a relatively high priority among the one or more reference image blocks.

14. A system on chip (SoC) comprising:
a memory configured to store a reference image; and
a motion estimator configured to extract one or more image blocks of the reference image in the memory, the motion estimator including:
a cache memory configured to extract one or more reference image blocks of the reference image based on a plurality of search points of the reference image, and to store the extracted one or more reference image blocks;
a reference bandwidth setting unit configured to determine a reference bandwidth; and
a motion estimation unit configured to determine a number of reference image blocks of the reference image that are to be extracted depending on the reference bandwidth, to determine a number of the plurality of search points of the reference image, and to perform a motion estimation using the extracted one or more reference image blocks of the reference image.

15. The SoC of claim 14, wherein the reference bandwidth is determined based on an available bandwidth of a bus that is connected to the motion estimator.

16. The SoC of claim 14, wherein, in response to an occupied bandwidth of the cache memory exceeding the reference bandwidth, the motion estimation unit controls at least one of a size and a quantity of the one or more reference image blocks being extracted from the cache memory to be reduced.

17. The SoC of claim 14, wherein the motion estimation unit controls the cache memory so that the quantity of the one or more reference image blocks is reduced by removing a reference image block having relatively a low priority among the one or more reference image blocks.

18. The SoC of claim 14, wherein, in response to an occupation bandwidth of the cache memory being less than the reference bandwidth, the motion estimation unit controls at least one of a size and a quantity of the reference image block being extracted by the cache memory to increase.

19. The SoC of claim 18, wherein the motion estimation unit controls the cache memory so that the quantity of the one or more reference image blocks is increased by adding a reference image block having a relatively high priority among the one or more reference image blocks.

* * * * *